O. H. LANGDON.
Improvement in Hand-Saws.
No. 115,328.  Patented May 30, 1871.
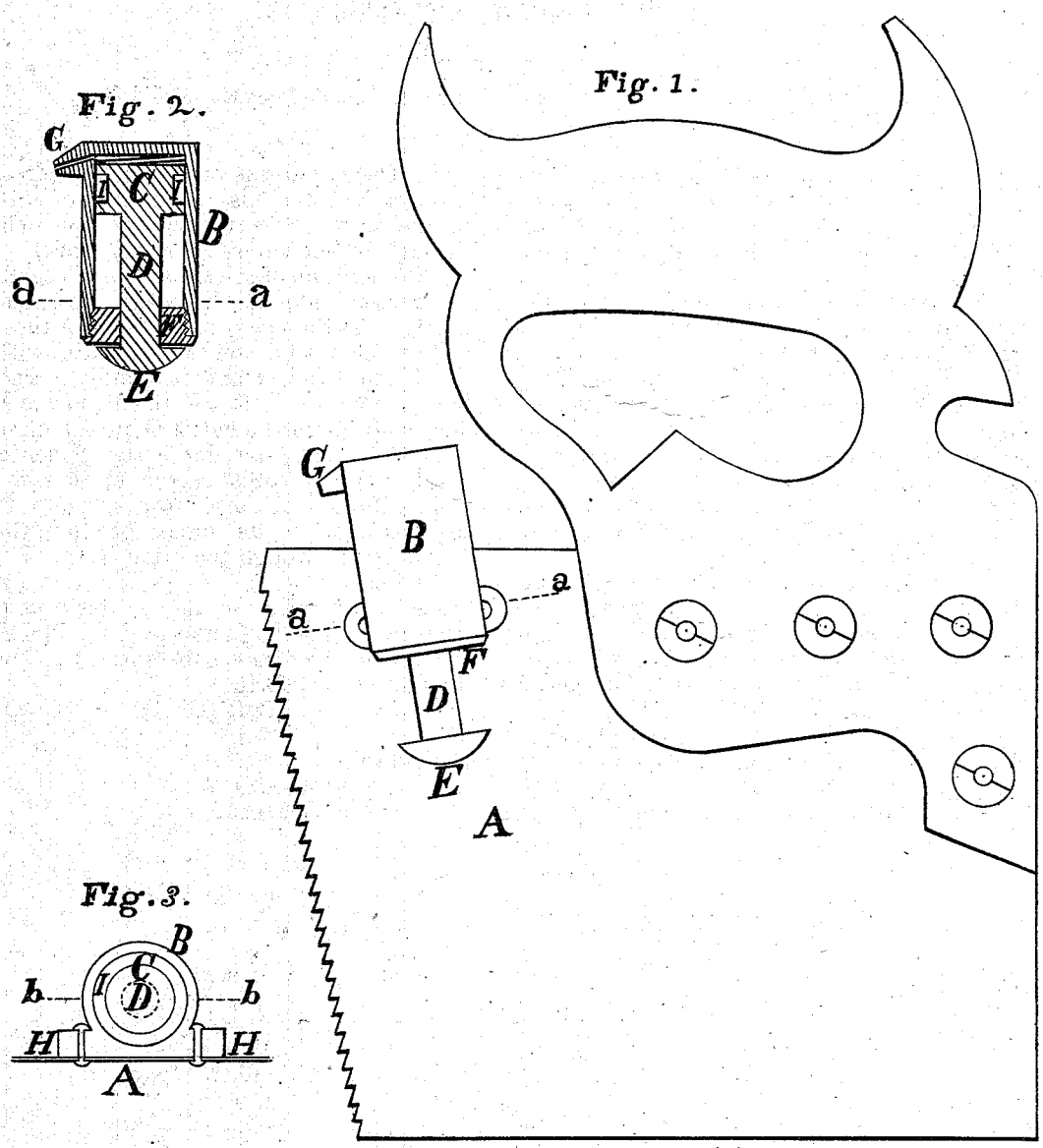

115,328

UNITED STATES PATENT OFFICE.

ORRIN H. LANGDON, OF HOMER, ASSIGNOR TO CHARLES W. KINNE, OF CORTLAND, NEW YORK.

IMPROVEMENT IN HANDSAWS.

Specification forming part of Letters Patent No. 115,328, dated May 30, 1871.

I, ORRIN H. LANGDON, of Homer, in the county of Cortland and State of New York, have invented certain Improvements in Handsaws, of which the following is a specification:

The object of my invention is to attach an apparatus to a handsaw which, being operated by the motion of the saw shall blow the dust from the front of the saw, and so keep visible any mark by which the workman desires to saw.

Figure 1 represents the saw with the attachment. Fig. 2 is a longitudinal section through the center of the blower. Fig. 3 is a transverse section through the blower and saw at the point of attachment.

B is a barrel or cylinder forming an air-chamber, with an outlet, G, at the bottom, pointing to the heel of the saw. D C is a piston working in the cylinder, having a button-shaped outer end or head, E. This may be covered or provided with rubber to ease the concussion of the parts when the piston end strikes the wood. At the bottom of the piston is a coil or other spring to throw the piston back when pressure is removed at its outer end. The cylinder is provided with ears H H, through which it may be riveted or screwed to the saw. F is the cap to the cylinder through which the piston-rod D works.

The operation of the apparatus is as follows: The piston being in the position represented in Fig. 1, as the saw is brought down the outer end of the piston comes in contact with the wood being sawed and is rapidly forced in; but as it goes in it forces the air in the cylinder out through the outlet G in the direction of the heel of the saw, and with sufficient force to drive away the dust in front of the saw-heel, and as the saw is raised the spring $m$ forces the piston out of its former position; the air following in through the orifice G.

I claim—

The combination of the blower above described, composed of the parts B G D C E I I H H, with a handsaw, substantially as and for the purpose set forth.

ORRIN H. LANGDON.

Witnesses:
CHAS. W. KINNE,
CHAS. H. DUELL.